United States Patent [19]

Henderson et al.

[11] 3,959,451
[45] May 25, 1976

[54] RECOVERY OF SULFUR DIOXIDE FROM GAS MIXTURES

[75] Inventors: James M. Henderson, New Brunswick, N.J.; William H. Wetherill, Staten Island, N.Y.

[73] Assignee: Asarco Incorporated, New York, N.Y.

[22] Filed: Feb. 26, 1974

[21] Appl. No.: 446,081

[52] U.S. Cl. ............................... 423/539; 423/243
[51] Int. Cl.² .................................... C01B 17/48
[58] Field of Search .......... 423/242, 243, 539, 541, 423/541 A, 545

[56] References Cited
UNITED STATES PATENTS

| | | | |
|---|---|---|---|
| 1,972,074 | 9/1934 | Boswell | 423/243 |
| 2,047,819 | 7/1936 | Boswell et al. | 423/243 |
| 2,128,027 | 8/1938 | Clark | 423/243 |
| 2,186,453 | 1/1940 | Gleason et al. | 423/539 |
| 2,295,587 | 9/1942 | Fleming et al. | 423/539 |
| 2,399,013 | 4/1946 | Fleming et al. | 423/539 |
| 3,330,621 | 7/1967 | Vian-Ortuno et al. | 423/242 |

FOREIGN PATENTS OR APPLICATIONS
669,966 9/1963 Canada .................. 423/541 A Primary Examiner—Oscar R. Vertiz
Assistant Examiner—Wayne A. Langel
Attorney, Agent, or Firm—R. J. Drew; E. J. Schaffer

[57] ABSTRACT

$SO_2$ is removed from a $SO_2$ - containing gas mixture utilizing an aromatic amine as absorbent, followed by scrubbing the $SO_2$ - depleted, aromatic amine - enriched gas with sulfurous acid solution to remove most of the gaseous aromatic amine therefrom and then with dilute sulfuric acid solution to remove substantially all of the small amount of residual gaseous aromatic amine from the gas. The aqueous scrubbing solutions containing aromatic amine sulfite and aromatic amine sulfate from the respective sulfurous acid and sulfuric acid scrubbing zones are combined and ammonia is added thereto, resulting in release of the aromatic amine and in the formation of ammonium sulfate. Aqueous solution containing the ammonium sulfate is introduced into the upper portion of the sulfurous acid scrubbing section.

26 Claims, 1 Drawing Figure

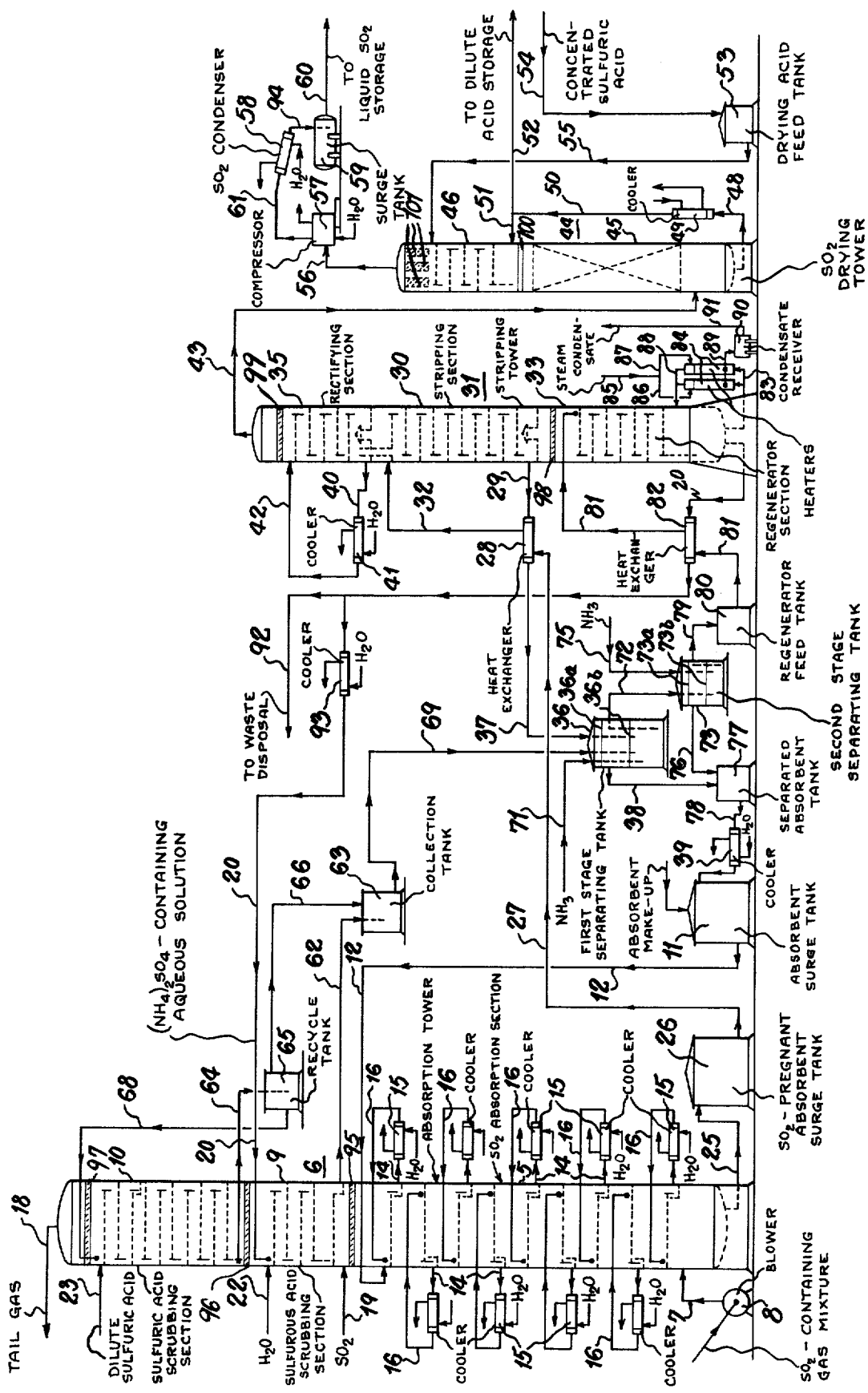

RECOVERY OF SULFUR DIOXIDE FROM GAS MIXTURES

BACKGROUND OF THE INVENTION

1. Field of the Invention

This invention relates to the recovery of sulfur dioxide and more particularly to a new and improved process for recovering sulfur dioxide from gas mixtures containing sulfur dioxide.

2. Description of the Prior Art

Sulfur dioxide has been recovered from gas mixtures heretofore by intimately contacting the gas mixture in an absorber with an organic base, for example an aromatic amine, e.g. dimethyl aniline, as absorbent. The effluent gas containing gaseous aromatic amine from the absorbing step is then scrubbed with a soda solution in a soda scrubber to remove residual sulfur dioxide from the gas as sodium sulfite followed by scrubbing the gas with dilute sulfuric acid solution in a sulfuric acid scrubber to remove the aromatic amine from the gas mixture as the aromatic amine sulfate, e.g. dimethyl aniline sulfate. The sulfur dioxide is stripped from the absorbent, and the expelled sulfur dioxide is subsequently recovered in purified, anhydrous, liquefied state. The aqueous effluent solution from the soda scrubber containing sodium sulfite and sodium acid sulfite or sodium sulfite and sodium carbonate and the aqueous effluent solution from the sulfuric acid scrubber containing aromatic amine sulfate are combined in a collecting tank, wherein the aromatic amine per se is released from the aromatic amine sulfate and sodium sulfate is formed by reaction of the aromatic amine sulfate separately with the sodium sulfite and sodium acid sulfite or sodium sulfite and sodium carbonate present in the combined solutions. The combined liquid in the collecting tank is then passed to a separating tank wherein the released aromatic amine and an aqueous solution layer separate by gravity separation as separate liquid layers. The liquid aromatic amine is withdrawn from its separate layer in the separating tank and passed to the absorbent supply tank for re-use in the absorber for absorbing sulfur dioxide from the gas mixture. Aqueous solution is withdrawn from the aqueous solution layer in the separating tank and passed to the regenerator wherein aromatic amine is released from aromatic amine sulfite contained in the aqueous solution by heating, and steam is generated which is utilized for stripping the sulfur dioxide from the pregnant aromatic amine. Waste aqueous solution containing sodium sulfate is withdrawn from the bottom of the regenerator and consequently considerable quantities of this potentially polluting sodium sulfate-containing waste solution is required to be disposed of without causing undue pollution. As a modification of the aforementioned prior art process, the soda scrubber may be omitted and sodium sulfite or another compound, e.g. sodium carbonate, which will react with the aromatic amine sulfate to result in the release of the aromatic amine and the formation of sodium sulfate may be mixed with the aqueous solution from the sulfuric acid srcubber and a part or all of a water phase separated from the stripped aromatic amine absorbent. The released aromatic amine separates as a separate layer from an aqueous solution layer containing the sodium sulfate and aromatic amine sulfite as aforementioned, and the separated aqueous solution is passed to the regenerator as is hereinbefore described. Considerable quantities of waste aqueous solution containing sodium sulfate are also withdrawn from the bottom portion of the regenerator in this modification, and this considerable sodium sulfate-containing waste solution is also required to be disposed of without causing undue pollution. The aforementioned process and modification thereof are disclosed in U.S. Pat. No. 2,399,013, and although these processes do give good results in recovering sulfur dioxide from gas mixtures, the processes leave room for improvement. In the first place, the considerable quantities of waste aqueous solution containing sodium sulfate that are produced are a nuisance and require a considerable monetary expenditure to dispose of such waste solution without undue pollution. Furthermore, considerable amounts of sulfuric acid solution are required to be purchased at considerable expense for scrubbing the effluent gas to remove gaseous aromatic amine.

Other prior art processes for recovery of sulfur dioxide from gas mixtures and which result in the disadvantageous formation of considerable quantities of sodium sulfate-containing waste aqueous solution required to be disposed of, as well as employing sulfuric acid solution as sole scrubbing liquid for removing aromatic amine absorbent from the effluent gas from the $SO_2$ absorbing step are disclosed in U.S. Pat. Nos. 2,186,453 and 2,295,587.

It is also known in the prior art to use lime for treating the aqueous scrubbing solution from the sulfuric acid scrubber to release the organic base absorbent and to form calcium sulfate. The main problem with the lime treatment is that serious problems are encountered in handling the waste liquid containing the formed calcium sulfate, in that serious scale build up occurs in the process equipment, especially in the heat exchangers, due to the calcium sulfate. Because of this the use of lime for treating the aqueous acid scrubbing solution in the process is undesirable and disadvantageous. U.S. Pat. No. 2,128,027 discloses the use of lime or another calcium compound in the presence of $SO_2$ and a neutral sulfate, e.g. sodium sulfate, potassium sulfate or ammonium sulfate, for treating the aqueous solution, after separation from the organic base, to precipitate sulfate ions as calcium sulfate, and liberate organic base which immediately forms a soluble sulfite.

U.S. Pat. Nos. 1,972,074 and 2,047,819 disclose washing effluent gas from the $SO_2$-absorber tower with sulfuric acid, hydrochloric acid or sulfurous acid to remove organic base absorbent from the gas.

OBJECTS OF THE INVENTION

One object of the invention is to provide a new and improved process for the recovery of sulfur dioxide from gas mixtures.

Another object of the invention is to provide a process for the recovery of sulfur dioxide from gas mixtures wherein the volume of potentially polluting waste liquid sulfate solution to be disposed of is considerably reduced.

A further object is to provide a process for the recovery of sulfur dioxide from gas mixtures wherein the quantity of potentially polluting soluble inorganic salts that are disposed of in waste liquid streams is considerably reduced.

Another object is to provide a cyclic, regenerative process for the recovery of sulfur dioxide from gas mixtures which results in a considerable reduction in the monetary cost of elimination of alkali sulfate in potentially polluting waste aqueous sulfate-containing solutions obtained in the process, due to the considerable reduction in the volume of such potentially polluting waste sulfate-containing solutions required to be disposed of and the considerable reduction of the quantity of alkali sulfate to be disposed of in such waste solutions.

An additional object is to provide a process for the recovery of sulfuric dioxide from gas mixtures wherein the formation of sulfurous acid in the sulfurous acid scrubbing zone is enhanced due to the presence of ammonium sulfate contained in an aqueous ammonium sulfate-containing solution.

A further object is to provide a process for recovery of sulfur dioxide from gas mixtures without the problem of scale build-up in the process equipment, especially in the heat exchangers, used in the process due to the handling of sulfate-containing waste liquids or solutions from the regenerator.

A further object is to provide a process for the recovery of sulfur dioxide from gas mixtures wherein the amount of sulfuric acid scrubbing solution required for removal of gaseous organic base, e.g. aromatic amine, from an effluent gas that has previously been intimately contacted with the aromatic amine in a sulfur dioxide-absorbing step is considerably reduced.

Still another object is to provide a process for the recovery of sulfur dioxide from gas mixtures, wherein a major portion of the gaseous organic baseabsorbent introduced into the gas during the $SO_2$ absorbing step is removed from the gas by scrubbing with sulfurous acid solution obtained by dissolving sulfur dioxide gas readily available and obtained in the process in water, whereby the amount of sulfuric acid solution required to be purchased or otherwise obtained for the scrubbing removal of the small amount of gaseous organic base from the effluent gas from the first-mentioned sulfurous acid scrubbing is considerably reduced.

A further object is to provide a process for the recovery of sulfur dioxide from gas mixtures characterized by minimizing or eliminating pollution and by economy and efficiency.

BRIEF SUMMARY OF THE INVENTION

The aforementioned objects and advantages are achieved by the process of the present invention for recovering sulfur dioxide from gas mixtures. In accordance with the process of the invention, subsequent to the sulfur dioxide absorbing and prior to the sulfuric acid solution scrubbing, the sulfur dioxide-impoverished effluent gas containing gaseous organic base absorbent from the sulfur dioxide absorbing or absorption zone is scrubbed in a sulfurous acid scrubbing zone with sulfurous acid aqueous solution in the presence of ammonium sulfate also contained in such solution to remove a major portion i.e. more than 50 percent, of the gaseous organic base absorbent from the gas. The sulfurous acid-and ammonium sulfate-containing aqueous solution is formed in such scrubbing zone by supplying sulfur dioxide-containing gas into this scrubbing zone which is in addition to sulfur dioxide contained in the sulfur dioxide-impoverished effluent gas passing into this scrubbing zone from the absorbing zone, and supplying at least a portion, ordinarily a major portion, i.e. more than 50 percent, or more of a liquid aqueous solution containing ammonium sulfate which is withdrawn from the absorbent regenerating zone into this scrubbing zone. The sulfur dioxide is dissolved in the water of liquid aqueous ammonium sulfate-containing solution in this scrubbing zone to form the sulfurous acid-and ammonium sulfate-containing aqueous solution.

More specifically, the process comprises absorbing sulfur dioxide from the gas mixture containing same by contacting the gas mixture with a liquid water-insoluble organic base absorbent, for example water-insoluble aromatic amine absorbent, capable of liberating or releasing the sulfur dioxide gas upon subsequent treatment, such as, for example, stripping with a gaseous stripping medium, or heating, or subjecting the $SO_2$-pregnant absorbent to reduced pressure. The sulfur dioxide-impoverished, organic base-enriched effluent gas from the absorbing step or zone is scrubbed in a sulfurous acid scrubbing zone with the sulfurous acid-and ammonium sulfate-containing aqueous solution to remove a major portion, i.e. more than 50 percent, of the gaseous organic base absorbent from the gas. the sulfurous acid is provided in the sulfurous acid scrubbing zone by supplying a sulfur dioxide-containing gas into such scrubber zone, ordinarily into the lower portion of an upright scrubber zone, and separately supplying liquid aqueous solution containing ammonium sulfate into this scrubbing zone. The sulfur dioxide gas is dissolved in the water of the aqueous ammonium sulfate solution in this scrubbing zone to form the sulfurous acid-and ammonium sulfate-containing aqueous scrubber solution therein. The effluent gas containing a small amount of residual gaseous organic base absorbent from the last-mentioned scrubbing zone is scrubbed with dilute sulfuric acid solution in a sulfuric acid scrubbing zone to remove all or substantially all residual organic base absorbent from the gas. Sulfur dioxide is stripped from the organic nitrogen base absorbent in a stripping zone and the liberated sulfur dioxide is recovered. The sulfurous acid scrubbing solution containing organic base-sulfurous acid reaction produce from the sulfurous acid scrubbing zone and the sulfuric acid scrubbing solution containing organic base-sulfuric acid reaction product from the sulfuric acid scrubbing zone are combined. Ammonia is added to the combined scrubbing solutions in a separating zone, the ammonia addition resulting in the organic base being released from the organic base-sulfuric acid reaction product and the formation of ammonium sulfate in the separating zone. Liquid organic base is separated from an aqueous liquid phase in the separating zone, and the separated liquid organic base is withdrawn from the separating zone and returned ultimately to the sulfur dioxide-absorbing step. Separated aqueous liquid phase containing the ammonium sulfate and organic base-sulfurous acid reaction product is withdrawn from the separating zone and passed to a regenerator zone, wherein this aqueous liquid phase is heated to thermally decompose the organic base-sulfurous acid reaction product and liberate gaseous organic base and sulfur dioxide gas and generate considerable steam. The steam, gaseous organic base and sulfur dioxide gas are passed to the stripping zone wherein the steam serves as the main gaseous stripping medium for stripping the sulfur dioxide from the sulfur dioxide-pregnant organic base absorbent. Liquid aqueous solution containing ammonium sulfate is withdrawn from the regenerator zone and a major portion, i.e. in excess of 50 percent, or all or substantially all of this aqueous waste solution is passed for supply to the sulfurous acid scrubbing zone as previously disclosed herein.

A liquid organic base absorbent-water mixture, for example an aromatic amine-water mixture, is ordinarily passed from the stripping zone to a separating zone wherein the organic base absorbent is separated from the water.

The process of this invention is especially meritoreous and a considerable improvement in this art by reasons of considerable reducing the amount of potentially polluting sulfate-containing solution from the regenerator that is discharged to waste, and also by considerably reducing the amount and hence the expense of sulfuric acid reagent required to be purchased for the sulfuric acid solution scrubber. The amount of soluble sulfate salt in the waste aqueous solution stream from the regenerator required to be disposed of may be reduced by as much as 90 percent by virtue of this invention. Further, the amount of sulfuric acid required to be purchased for the sulfuric acid scrubber of this invention may be reduced by as much as 95 percent of the quantity of sulfuric acid required to be purchased for the sulfuric acid scrubber of the prior art processes.

The soluble reaction product of the organic base, for example the aromatic amine, e.g. dimethyl aniline, with the sulfuric acid of the dilute sulfuric acid solution is referred to from time to time herein as the organic base sulfate or aromatic amine sulfate or dimethyl aniline sulfate respectively. The soluble reaction product of the organic base, for example the aromatic amine, e.g. dimethyl aniline, with sulfurous acid of the dilute sulfurous acid solution is referred to from time to time herein as the organic base sulfite or aromatic amine sulfite or dimethyl aniline sulfite respectively.

A major portion, i.e. more than 50 percent by volume, of the liquid aqueous ammonium sulfate-containing solution withdrawn from the regenerator zone is usually passed to the sulfurous acid scrubbing zone. A quantity in the range of about 60 to about 90 percent by volume of the withdrawn liquid aqueous ammonium sulfate-containing solution from the regenerator zone is ordinarily passed to the sulfurous acid scrubbing zone. All or substantially all of the withdrawn liquid aqueous ammonium sulfate solution from the regenerator zone can, for a short or limited time, be passed to this sulfurous acid scrubbing zone. A portion which is less than 50 percent by volume of the withdrawn liquid aqueous ammonium sulfate-containing solution can, if desired, be passed to the sulfurous acid scrubbing zone, but this is not preferred as it does not reduce the quantity of potentially polluting waste ammonium sulfate-containing solution to be disposed of to the extent that passing a major portion or more of such withdrawn liquid ammonium sulfate-containing solution to the sulfurous acid scrubbing zone does.

The passage of the ammonium sulfate aqueous solution from the regenerator zone to the sulfurous acid scrubbing zone, in addition to considerably reducing the amount of waste solution from the regenerator zone to be disposed of, is also a considerable improvement in that the presence of ammonium sulfate in this scrubbing zone considerably enhances the dissolution of the $SO_2$ gas in water to form sulfurous acid and also enhances the recovery of organic base, e.g. aromatic amine, in this sulfurous acid scrubbing zone. Thus the presence of the ammonium sulfate results in dissolution of greater quantities of $SO_2$ in water to form the sulfurous acid in this scrubbing zone than in the absence of the ammonium sulfate. Due to the formation of greater quantities of sulfurous acid solution in this scrubber zone, there is appreciably greater recovery of organic base, e.g. aromatic amine in this scrubbing zone.

The amount of ammonia added to the combined aqueous solutions or aqueous solution in the separator zone or zones is an amount thereof sufficient to result in the liberation of the organic base, e.g. the aromatic amine, from the organic base-sulfuric acid reaction product, e.g. the aromatic amine sulfate reaction product, present in the aqueous solution therein and also the formation of ammonium sulfate in the aqueous solution. The ammonia usually added to the combined aqueous solution in the separating zone or zones is equivalent to the total content of sulfate radical, i.e. $SO_4$, present in the combined aqueous solutions therein. This total content of sulfate radical is the content of sulfate radical present in the organic base-sulfuric acid reaction product, e.g. the aromatic amine sulfate reaction product, from the sulfuric acid scrubbing zone, plus any organic base sulfate usually passing from the sulfurous acid scrubbing zone due to oxidation of a small amount of the organic base-sulfurous acid reaction product which usually occurs in such scrubbing zone, plus any organic base sulfate usually passing from the $SO_2$-absorber zone by way of the stripping zone, plus any organic base sulfate that may be formed in the stripping zone and/or rectifying zone and passing from the stripping zone. Although more than such equivalent amount of ammonia can be added to the combined aqueous solutions in the separating zone or zones, if desired, it is essential that the total amount of ammonia which is added to these combined aqueous solutions in the separating zone or zones should be insufficient to result in the combined aqueous solutions or aqueous solution retaining a significant amount of sulfur dioxide in the regenerating zone due to the presence of excess ammonia.

Ammonia is usually utilized in the present invention as ammonia gas. However the ammonia can, if desired, be utilized in this invention when dissolved in water, i.e. as ammonium hydroxide.

The ammonia is added to the combined aqueous solutions containing the organic base-sulfurous acid-reaction product and the organic base-sulfuric acid reaction product from the scrubbing zones either in a single separating zone, or in at least two separating zones or stages. When the plurality of separating zones or stages are utilized, which is preferred, usually two separating zones or stages are employed.

The sulfur dioxide-containing gas supplied into the sulfurous acid scrubbing zone, is ordinarily and preferably sulfur dioxide gas obtained from elsewhere in the process although it may be obtained from a source other than the process, and is in addition to the sulfur dioxide contained in the sulfur dioxide-impoverished effluent gas passing into this scrubber zone from the sulfur dioxide absorbing step. And this is important from an economic standpoint, inasmuch as considerably less sulfuric acid is required to be purchased for the dilute sulfuric acid scrubbing which follows and hence the expense of the larger amount of sulfuric acid is eliminated due to the prior removal of a considerable amount of the residual organic base in the effluent gas by the sulfurous acid aqueous solution formed from the readily available $SO_2$ obtained from elsewhere in the process. As exemplary, this sulfur dioxide-containing gas supplied into the sulfurous acid sulfate scrubbing zone can be pure or substantially pure $SO_2$ gas bled off the $SO_2$ gas line or conduit leading from a $SO_2$ drying zone, for example from the upper portion of the $SO_2$ drying tower, to a compressor for compressing the $SO_2$ gas for liquefying same, pure or substantially pure $SO_2$ gas drawn off a top $SO_2$ gas-containing portion of a surge tank for liquefied $SO_2$, or pure or substantially pure $SO_2$ bled off the upper $SO_2$ gas-containing portion of a storage tank for liquid $SO_2$, or from a combination of any or all of these sources of $SO_2$ gas. Also as exemplary, this $SO_2$ gas supplied into the sulfurous acid scrubbing zone can be obtained as initially liquid $SO_2$ from a liquefied $SO_2$ surge supply tank or from a liquid $SO_2$ storage tank, and then gasified by passage through an expansion valve or valves or by other suitable means prior to being introduced into this scrubbing zone. The $SO_2$-containing gas supplied into the sulfurous acid scrubbing zone can, if desired, be impure $SO_2$-containing gas bled off the $SO_2$-containing gas mixture supply conduit leading from a blower to the inlet for the $SO_2$-containing gas mixture of the $SO_2$ absorber, although this source of the gas is not preferred.

The passage or supply of sulfur dioxide-containing gas into the sulfurous acid scrubbing zone, which is in addition to the $SO_2$ contained in $SO_2$-impoverished effluent gas passing into this scrubbing zone from the $SO_2$-absorbing zone, constitutes a considerable improvement over the utilization of only the $SO_2$ contained in the $SO_2$-impoverished effluent gas from the absorbing zone for forming the sulfurous acid in the sulfurous acid scrubbing zone. The reason for this is that it is difficult to control the $SO_2$ content of the $SO_2$-impoverished effluent gas from the $SO_2$ absorbing zone, and it is particularly difficult to control the $SO_2$ content of such effluent gas from the absorbing zone if the $SO_2$-containing gas feed stream to the absorber zone has a varying content of $SO_2$.

The sulfur dioxide-containing gas other than the $SO_2$ present in the effluent gas from the $SO_2$ absorbing zone is supplied into the sulfurous acid scrubbing zone in an amount sufficient to result in the formation of an amount of sulfurous acid in aqueous solution therein, due to dissolution of the $SO_2$ gas in and reaction with the water of the liquid aqueous ammonium sulfate solution and water separately added as such to this scrubbing zone if this is done, which is sufficient to remove a significant portion, which is usually a major portion, i.e. more than 50 percent, or all the substantially all the organic base, e.g. aromatic amine, from the effluent gas passing into this scrubbing zone from the $SO_2$-absorbing zone. However the amount of sulfur dioxide-containing gas supplied into the sulfurous acid scrubbing zone should be insufficient to result in an excessive, air-polluting amount of sulfur dioxide gas in the tail gas from the subsequent sulfuric acid scrubbing zone. The sulfur dioxide-containing gas, other than the $SO_2$ gas present in the effluent gas from the $SO_2$ absorbing step or zone is usually fed into the sulfurous acid scrubbing zone in amount sufficient to result in the formation of an amount of sulfurous acid therein which is at least equivalent to the content of organic base, e.g. aromatic amine, in the effluent gas passing into this scrubbing zone from the sulfur dioxide absorbing zone. Again, the amount of sulfur dioxide-containing gas fed into the sulfurous acid scrubbing zone should be insufficient to result in an excessive, air-polluting amount of sulfur dioxide gas in the tail gas from the subsequent sulfuric acid scrubber zone.

Any organic base absorbent capable of absorbing sulfur dioxide gas from a gas mixture and which will readily release sulfur dioxide gas upon subsequent treatment, such as, for example, stripping with steam, heating, or subjecting the $SO_2$- pregnant absorbent to reduced pressure, is utilizable herein. The organic base absorbent herein is also characterized by being water-insoluble. By "water insoluble" as used herein and in the appended claims in referring to the organic base is meant the organic base is either insoluble in water or only slightly soluble or of low solubility in water. Exemplary of the organic base absorbents are organic nitrogen-containing base absorbents, for example aromatic amines having the aforementioned capabilities and characteristic, e.g. dimethyl aniline, i.e. N,N-dimethyl aniline; and xylidine of commerce which is a mixture of isomers of xylidine. The xylidine is utilized herein when mixed with water, such xylidine-water mixture containing the xylidine and water in a volume ratio in the typical volume ratio range of 1:1 to 1:10 respectively. The dimethyl aniline is utilizable herein in anhydrous or substantially anhydrous state or as a dimethyl aniline-water mixture.

The sulfur dioxide-containing gas mixture which is treated by the process of this invention for the recovery of the sulfur dioxide is exemplified by sulfur dioxide-containing waste smelter gases, flue gases, and the like. The process herein may be employed for removal of sulfur dioxide from a gas mixture containing any concentration of the sulfur dioxide. However the process herein is especially suitable for removal of sulfur dioxide from a gas mixture containing a relatively small concentration of sulfur dioxide in the range of about 1 to about 10 percent by volume $SO_2$.

BRIEF DESCRIPTION OF THE DRAWING

The accompanying drawing is a flow sheet of a process of the invention and illustrating diagrammatically, a plant for its practise.

DETAILED DESCRIPTION OF THE DRAWING

With reference to the flow sheet of the drawing, a cool, clean gas mixture containing sulfur dioxide, e.g. a sulfur dioxide-containing gas from a copper smelter containing typically 6 percent by volume $SO_2$ (dry), is introduced at a temperature of typically 100°F. into the lower portion of absorber section 5 of absorption tower 6 through line 7 by means of blower 8. Tower 6, which also includes sulfurous acid scrubbing section 9 and sulfuric acid scrubbing section 10 in addition to absorber section 5, is, as shown, of the bubble plate type and is equipped with bubble cap trays. The sulfur dioxide-containing gas mixture passes upwardly within absorber section 5 in countercurrent flow to anhydrous liquid organic base, for example an aromatic amine, e.g. dimethyl aniline supplied to the upper portion of absorber section 5 at a temperature of typically 80°F. from absorbent surge supply tank 11 through line 12. The uprising sulfur dioxide-containing gas bubbles through a descending current of cool, anhydrous or substantially anhydrous, dimethyl aniline which flows downwardly from tray to tray in absorber 5, and consequently the sulfur dioxide is transferred from the gas mixture to the dimethyl aniline absorbent. Inasmuch as the absorption of the sulfide dioxide in the dimethyl anilinne is exothermic and considerable heat is evolved during the absorption, the absorber section 5 is provided with cooling means in order to remove the reaction heat or heat of solution and thereby (1) increase the capacity of the dimethyl aniline absorbent to transfer sulfur dioxide, and (2) reduce the vapor pressure of the dimethyl aniline, thus saving reagents for the subsequent recovery of the dimethyl aniline absorbent. The dimethyl aniline absorbent at an elevated temperature is removed from each tray in the absorber 5 through conduit 14 and passed to cooler 15, cooled in each cooler 15 to a temperature of typically about 72°F. by indirect heat exchange with a cooling fluid, ordinarily water, and returned to the same tray via conduit 16. The absorber section 5 is thereby cooled and the temperature of the dimethyl aniline absorbent therein is maintained at typically about 75°F. in the upper portion of absorber section 5 to about 100°F. in the lower portion thereof.

The effluent gas from absorber section 5 is impoverished in sulfur dioxide and enriched in gaseous dimethyl aniline and passes sequentially through sulfurous acid scrubbing section 9 and sulfuric acid scrubbing section 10 and leaves scrubbing section 10 through line 18 very low in sulfur dioxide content and free or substantially free of absorbent. In sulfurous acid scrubbing section 9, sulfur dioxide gas and liquid aqueous ammonium sulfate solution withdrawn from the bottom of the regenerator are separately fed into the lower and upper portion respectively of scrubber section 9 beneath the lowermost tray and above the uppermost tray respectively through lines 19 and 20 respectively. Liquid water per se may be supplied into the upper portion of the sulfurous acid-ammonium sulfate scrubbing section 9 through line 22 for the sulfurous acid production in the event additional water is needed to supplement the water introduced into this scrubbing section in the aqueous ammonium sulfate solution, and to maintain the water balance in the process. The uprising sulfur dioxide gas is dissolved in the water of the descending current of aqueous ammonium sulfate solution to form a dilute aqueous solution of sulfurous acid and ammonium sulfate which flows downwardly from tray to tray in scrubber section 9. The presence of the ammonium sulfate in sulfurous acid scrubbing section 9 results in a considerably enhanced dissolution of the $SO_2$ gas in the water to from sulfurous acid as is previously disclosed herein. The uprising effluent gas bubbles through the descending current of thus-formed dilute sulfurous acid- and ammonium sulfate-containing solution which flows downwardly from tray to tray in scrubber 9, and a major portion, i.e. more than 50 percent, and typically more than 90 percent of the gaseous dimethyl aniline present in the gas is removed from the gas in scrubbing section 9 by reaction with the sulfurous acid in the presence of the ammonium sulfate to form dimethyl aniline sulfite. The liquid aqueous sulfurous acid-and ammonium sulfate-containing scrubbing solution also containing the thus-formed dimethyl aniline sulfite is withdrawn from the lower portion of scrubbing section 9 through line 62 and passed to collection tank 63.

The uprising effluent gas leaves the sulfurous acid scrubbing section 9 still containing a small amount of residual gaseous dimethyl aniline as well as a small amount of sulfur dioxide gas, and enters and passes upwardly within sulfuric acid scrubbing section 10, wherein the gas is bubbled through a descending current of dilute sulfuric acid aqueous solution typically of 10 percent sulfuric acid concentration which is introduced into the upper portion of sulfuric acid scrubber 10 above the uppermost tray therein through conduit 23. All or substantially all of the residual gaseous dimethyl aniline is removed from the sulfur dioxide-impoverished gas in scrubbing section 10 by reaction with the sulfuric acid to form dimethyl aniline sulfate. The tail gas exits from sulfuric acid scrubber 10 via line 18 and typically contains less than 0.10 percent by volume sulfur dioxide. Dilute liquid aqueous sulfuric acid solution containing the thus-formed dimethyl aniline sulfate is removed from the lowermost tray in scrubbing section 10 and passed through line 64 to recycle tank 65. A portion of the dilute liquid acid solution in tank 65 is recycled through line 68 and introduced into the upper portion of scrubbing section 10 above the uppermost tray therein.

In a modification, a portion of the dilute liquid aqueous sulfuric acid solution containing a relatively high concentration of the thus-formed organic base sulfate, for example aromatic amine sulfate, e.g. dimethyl aniline sulfate, which is removed from the lower portion of the upright or vertically elongated scrubbing zone or section 10 and from the lowermost tray in scrubbing section 10 as shown, and usually a major portion, i.e. more than 50 percent, of such withdrawn solution, is recycled and introduced at a temperature of typically 80°F. into an intermediate portion of scrubbing zone or section 10, and onto the third or fourth bubble cap tray from the top, preferably the fourth tray from the top, in the embodiment of the flow sheet of the drawing, instead of being introduced into the top portion of the scrubbing zone 10 above the uppermost tray therein. Dilute liquid aqueous sulfuric acid solution containing a relatively low concentration of the thus-formed organic base sulfate, for example aromatic amine sulfate, e.g. dimethyl aniline sulfate, is withdrawn from an intermediate or upper intermediate portion of the scrubbing zone or section 10 and with the point of withdrawl thereof being spaced above the point of introduction of the first-mentioned solution recycled from the lower portion of the scrubbing zone, and withdrawn from the second or third tray from the top, preferably the third tray from the top, in the embodiment of the flow sheet, and at least a major portion, i.e. more than 50 percent of this withdrawn solution and usually all of this withdrawn solution is recycled, at a temperature of typically 80°F., and introduced into the upper portion of this scrubbing zone or section 10, above the uppermost tray as shown in the embodiment of the flow sheet. Consequently, in the top portion of scrubbing zone or tower section 10 the liquid aqueous sulfuric acid solution contains substantially no organic base, e.g. aromatic amine, or at most only a relatively small amount of aromatic amine, whereas the liquid aqueous sulfuric acid solution at the bottom of the scrubbing zone or section 10 contains a relatively large amount and indeed the greatest amount of aromatic amine in this scrubbing zone. This enables the best operation of sulfuric acid scrubbing zone or section 10, with the tail gas leaving the top portion of scrubbing section 10 through line 18 being free or substantially free of gaseous nitrogen base absorbent, e.g. aromatic amine absorbent, as well as being of low $SO_2$ content. At the same time the top-most two or three trays in scrubbing section 10 (as well as all remaining trays in section 10) contain entirely sufficient or adequate quantities of liquid dilute sulfuric acid scrubbing solution for scrubbing the gas.

The sulfur dioxide-pregnant dimethyl aniline is withdrawn from the lower portion of absorber section 5 below the lowermost tray therein and passed through conduit 25 at a temperature of typically about 100°F. and passed to surge tank 26. From surge tank 26, the sulfur dioxide-pregnant dimethyl aniline is passed through conduit 27 to heat exchanger 28 wherein it is preheated by indirect heat exchange with a liquid water-dimethyl aniline mixture supplied at an elevated temperature of typically 217°F. to heat exchanger 28 from the bottom portion of stripping section 30 via line 29, after which the sulfur dioxide-pregnant dimethyl aniline is introduced at an elevated temperature of typically 176°F. into the upper portion of stripping section 30 of tower 31 through line 32. Tower 31 is, as shown, of the bubble plate type and equipped with bubble cap trays. The descending pregnant liquid dimethyl aniline passes in intimate countercurrent contact in stripping section 30 with a considerable quantity of uprising steam and also with gaseous dimethyl aniline supplied from regenerator section 33 whereby the sulfur dioxide is stripped from the dimethyl aniline. The stripped or liberated sulfur dioxide gas passes upwardly together with a small amount of residual dimethyl aniline and also steam into rectifying section 35. Most of the steam is condensed in stripper 30 due to giving up its heat in stripping the sulfur dioxide from the dimethyl amine. The stripped liquid dimethyl aniline and condensed steam, i.e. water, are withdrawn from the lower portion of stripping section 30 through line 29 and passed at an elevated temperature of typically 217°F. to heat exchanger 28 wherein the hot liquid dimethyl aniline-water mixture preheats the pregnant dimethyl aniline feed to the stripper by indirect heat exchange, and is cooled in so doing. The liquid dimethyl aniline-water mixture is then passed to first stage separating tank 36 through line 37 wherein it stratifies or separates by gravity separation into an upper layer 36a of liquid dimethyl aniline and a lower liquid water or aqueous layer 36b. Liquid anhydrous or substantially anhydrous dimethyl aniline is withdrawn from the upper layer of separated dimethyl aniline in separating tank 36 through line 38 and passed via line 38, collection tank 77, and line 78 to dimethyl aniline supply surge tank 11 where it is ready for use in another cycle. Prior to being introduced into tank 11 the dimethyl aniline at an elevated temperature of typically 126°F. is indirectly cooled in cooler 39 with a suitable cooling fluid, for instance cooling water. Liquid anhydrous or substantially anhydrous dimethyl aniline is added as make up to surge supply tank 11 through line 47.

All or substantially all of the residual gaseous dimethyl aniline is removed from the uprising gaseous mixture comprising gaseous dimethyl aniline, sulfur dioxide gas and steam in rectifying section 35 by absorption in downwardly flowing dilute aqueous sulfurous acid solution, the sulfurous acid solution being formed in rectifying section 35 due to the condensation of most if not all of the steam and the dissolution of a small amount of the sulfur dioxide gas in the resulting liquid water. The gaseous dimethyl aniline reacts with the sulfurous acid of the dilute liquid aqueous sulfurous acid solution in rectifying section 35 to form dimethyl aniline sulfite. Liquid aqueous solution containing sulfurous acid and dimethyl aniline sulfite is withdrawn at an elevated temperature of typically 155°F. from a lower portion of rectifying section 35 through line 40 and, after being indirectly cooled in cooler 41, with a cooling fluid, ordinarily water, is recycled and introduced into the upper portion of rectifying section 35 through line 42.

Sulfur dioxide gas is withdrawn from the top portion of rectifying section 35 through line 43 and introduced into the lower portion of two stage drying tower 44. The upper or second drying stage 46 of tower 44 is, as shown, of the bubble plate type and equipped with bubble cap trays. The lower or first drying stage 45 of tower 44 is, as shown, packed with suitable gas-liquid contact material which were Berl saddles. The water-containing sulfur dioxide gas passes upwardly in packed first drying stage 45 packed with Berl saddles in intimate contact with a moderate strength liquid sulfuric acid solution, typically sulfuric acid solution of 75 percent sulfuric acid concentration as supplied to the first drying stage 45, whereby most of the water vapor is removed from the gas. From first stage 45 the sulfur dioxide gas containing a small amount of residual water vapor passes upwardly into second drying stage 46 equipped with bubble cap trays wherein the uprising gas passes in intimate countercurrent contact with liquid concentrated sulfuric acid, typically sulfuric acid of 98 percent sulfuric acid concentration as supplied to the second drying stage 46, whereby all or substantially all of the water vapor is removed from the gas. Dilute sulfuric acid solution at an elevated temperature is withdrawn from the bottom portion of tower 44 through line 48 and, after being indirectly cooled in cooler 49 with a suitable cooling fluid, ordinarily cooling water, is recycled and introduced into the upper portion of first drying stage 45 through lines 50 and 51. A portion of this dilute sulfuric acid solution is withdrawn through line 52 from that being recycled to first drying stage 45 and passed to dilute acid storage. Concentrated liquid sulfuric acid is supplied from a suitable source of the concentrated acid, for instance a sulfuric acid plant, to feed tank 53 through line 54, and from tank 53 the concentrated liquid acid is passed into the upper portion of second drying stage 46 in tower 44 through line 55.

The dry $SO_2$ gas is withdrawn from the top portion of tower 44 through line 56 and, after being compressed in compressor 57, is passed to condenser 58 through line 61. The compressed sulfur dioxide at an elevated temperature is cooled to a sufficiently low temperature in condenser 58, by indirect cooling wiith a suitable cooling fluid, ordinarily cooling water, to liquefy the sulfur dioxide gas. The liquefied sulfur dioxide is passed from condenser 58 through line 94 to surge tank 59 and thence through line 60 to liquid $SO_2$ storage.

Liquid aqueous solution containing dimethyl aniline sulfite and sulfurous acid is withdrawn from the lower portion of scrubber section 9 through line 62 and passed through line 62 to collection tank 63. Liquid aqueous solution containing dimethyl aniline sulfate is withdrawn from the lower portion of scrubbing section 10 through line 64 and passed to tank 65 and thence to collection tank 63 through line 66. A portion of the liquid aqueous solution in tank 65 is recycled into the upper portion of scrubbing section 10 through line 68. The combined liquid aqueous solutions containing dimethyl aniline sulfate, dimethyl aniline sulfite, and sulfurous acid are withdrawn from collection tank 63 and passed into first stage separating tank 36 through line 69.

Ammonia gas is supplied into first stage separating tank 36, which is a closed tank, through line 71 while avoiding supply of any calcium compound into tank 36 or anywhere else in the system. The ammonia gas is bubbled as sole added treating agent beneath the surface of the lower layer 36b of aqueous liquid solution in first stage separator 36. The quantity of ammonia introduced into first stage separator 36 is an amount sufficient to react with a portion of the dimethyl aniline sulfate, for example a major portion, i.e. more than 50 percent, of the dimethyl aniline sulfate in separator 36 to release dimethyl aniline and form ammonium sulfate therein but insufficient to react with all of the dimethyl aniline sulfate in separator 36. The liberated dimethyl aniline passes by gravity separation to the upper layer 36a in separator 36 from where anhydrous or substantially anhydrous dimethyl-aniline is withdrawn through line 38 and ultimately returned to the sulfur dioxide-absorbing step in absorber section 5 of tower 6 as is previously disclosed herein. Aqueous liquid containing dimethyl aniline sulfite, ammonium sulfate and a small amount of residual dimethyl aniline sulfate is withdrawn from lower aqueous layer 36b in first stage separating tank 36 through line 72, passed to second stage separating tank 73, and introduced into second stage separator 73 beneath the level of the lower layer of aqueous solution therein. Ammonia gas is supplied into second stage separating tank 73 through line 75 while avoiding supply of any calcium compound into tank 73. The ammonia gas is bubbled as sole added treating agent beneath the surface of the lower layer of aqueous solution therein. The quantity of ammonia introduced into second stage separating tank 73, which is a closed tank, is an amount thereof sufficient to release or liberate the dimethyl aniline from all remaining dimethyl aniline sulfate in the aqueous liquid in separator 73. The ammonia reacts with the dimethyl aniline sulfate in separating tank 73 to release all or substantially all dimethyl aniline therefrom and also to form ammonium sulfate. The liberated dimethyl aniline passes by gravity separation to the upper layer 73a in separator 73 from where anhydrous or substantially anhydrous dimethyl aniline is withdrawn trhough line 76 and passed to separated dimethyl aniline collecting tank 77. This dimethyl aniline is combined in tank 77 with dimethyl aniline withdrawn from the upper layer thereof in first stage separator tank 36, and the combined liquid dimethyl aniline is returned, after indirect cooling in cooler 39, to scrubber section 5 of tower 6 via line 78, surge tank 11 and line 12. Liquid aqueous solution containing dimethyl aniline sulfite and ammonium sulfate is withdrawn from the lower layer thereof in second stage separating tank 73 through line 79 and passed to regenerator feed tank 80. Such liquid aqueous solution is withdrawn from tank 80 through line 81 and, after being preheated in heat exchanger 82 by indirect heat exchange with ammonium sulfate-containing aqueous solution at elevated temperature of typically 221°F. being passed to scrubbing section 9 of tower 6 through line 20, is introduced into the upper portion of regenerator section 33 of tower 31 above the uppermost tray therein. This liquid aqueous solution is heated to its boiling point at the prevailing pressure by being withdrawn from the lower portion of regenerator section 33 through line 83 and passed to regenerator heaters 84, wherein the solution is heated by indirect heat exchange with steam or other suitable heating fluid introduced through lines 85, 86 and 87, after which it is re-introduced into the lower portion of regenerator section 33 below the lowermost tray therein through line 88. Due to the solution having been heated to its boiling point at the prevailing pressure in heaters 84, the dimethyl aniline sulfite is decomposed in regenerator section 33 to liberate gaseous dimethyl aniline and sulfur dioxide gas, and a considerable quantity of process steam is generated. The resulting gaseous dimethyl aniline, sulfur dioxide gas and steam pass upwardly in regenerator section 33 and into stripping section 30 wherein the steam and gaseous dimethyl aniline pass into direct contact with the pregnant liquid dimethyl aniline to strip sulfur dioxide from the dimethyl aniline. Cooled and condensed steam is withdrawn from the lower portion of heaters 84 through line 89 and passed to condensate receiver tank 90 wherein the water condensate is collected, the water condensate being withdrawn from receiver 90 and returned for steam generation or other use through line 91.

Liquid aqueous solution containing ammonium sulfate is withdrawn at elevated temperature of typically 221°F. from the lower portion of regenerator section 33 through line 20 and, after being used to preheat liquid aqueous solution containing dimethyl aniline sulfite and ammonium sulfate flowing in line 81 by indirect heat exchange in heat exchanger 82, whereby this ammonium sulfate-containing aqueous solution is cooled, is passed without any treatment thereof except for cooling into the upper portion of sulfurous acid scrubbing section 9 through line 20 as is previously disclosed herein. A minor portion or small amount of liquid aqueous solution containing ammonium sulfate is bled off the main stream thereof through line 92 and passed to waste disposal. The ammonium sulfate-containing aqueous solution is cooled indirectly in cooler 93 with a suitable cooling fluid, usually water, prior to being introduced into scrubbing section 9.

The absorption tower 6, as shown, consists of a single bubble-plate column which is divided into three separate units or sections. The $SO_2$-absorber section 5, which is the bottom section, consists of nine bubble cap trays as shown. The sulfurous acid scrubbing section 9, located directly above absorber section 5, consists of five bubble cap trays as shown. The sulfuric acid scrubbing section 10, which is the top section and located directly above scrubbing section 9, consists of 10 bubble cap trays as shown. Each of the three sections in absorption tower 6, is separate and distinct in operation and is provided with independent inlets and outlets for the liquid flow. The stripping tower 31, as shown, also consists of a single bubble plate tower and is divided into three units or sections. The regenerator section 33, which is the bottom section, consists of seven bubble cap trays as shown. The stripping section 30, which is located directly above the regenerator section, consists of eleven-bubble cap trays as shown. The rectifying section 35, which is the top section and located directly above the stripping section, consists of six bubble cap trays as shown. The drying tower 44, as shown, also consists of a single tower which is divided into two units, sections or stages. The first drying section or stage 45, which is the bottom section, is packed with a suitable gas-liquid contact material which was Berl saddles. The second drying section or stage 46 located directly above first drying stage 45, consists of five bubble cap trays as shown. Mist eliminators 95, 96 and 97 are provided in tower 6, mist eliminators 98 and 99 in tower 31, and mist eliminators 100 and 101 in tower 44.

The improvements and advantages of this invention can be attained, at least in part, in processes varying in certain respects from the flow sheet shown in the accompanying drawing. Thus, the $SO_2$ absorber section 5, sulfurous acid scrubbing section 9 and sulfuric acid scrubbing section 10 of tower 6 can be separate columns or towers. The regenerator section 33 of tower 31 can also be a separate column or tower and the stripping section and rectifying section of tower 31 a separate column or tower. Moveover the two drying stages 45 and 46 of $SO_2$ drying tower 44 can be separate columns or towers.

Any suitable gas-liquid contacting means or material can be utilized in towers 6, 31 and 44 of the process of the flow sheet of the accompanying drawing. The bubble cap trays utilized in $SO_2$ absorption section 5, and sulfurous acid and scrubbing sections 9 and 10 respectively of tower 6, in regenerator, stripping and rectifier sections 33, 30 and 35 respectively of tower 31, and drying stage 46 of tower 44 and the Berl saddles utilized in drying stage 45 of tower 44 are preferred for the gas-liquid contacting, but valve trays, Raschig rings, Intalox saddles or other suitable gas-liquid contact means are utilizable.

It will be understood that the system shown in the flow sheet of the accompanying drawing is provided with the required pumps, valves, meters, etc., which are not shown for the purpose of clarity.

DESCRIPTION OF THE PREFERRED EMBODIMENTS

Preferably a major portion in the range of about 65 percent to about 90 percent by volume of the liquid aqueous ammonium sulfate-containing solution withdrawn from the regenerator zone, is passed to the sulfurous acid scrubbing zone.

The total amount of ammonia added to the combined aqueous solutions in the separator zone or separator zones for releasing the organic base, e.g. the aromatic amine from the organic base sulfate, e.g. aromatic amine sulfate, is preferably an amount thereof which will result in the waste liquid aqueous solution at the lower portion of the regenerator zone and which is withdrawn from the lower portion of the regenerator zone having a pH of 5 to 6, more preferably 5.5 to 6.

The ammonia is preferably added to the combined aqueous solutions or solution containing the organic base-sulfurous acid reaction product and the organic base sulfuric acid reaction product in the separating zone or zones as ammonia gas or gaseous ammonia.

Preferably the ammonia is added to the combined aqueous solutions containing the organic base-sulfurous acid reaction product and the organic base-sulfuric acid reaction product in two or more stages, more preferably two stages. In accordance with this preferred embodiment the ammonia is added to the combined liquid aqueous solutions in a first stage separating zone in an amount sufficient to result in the liberation of the organic base, e.g. aromatic amine, from a substantial portion, e.g. a major portion, i.e. in excess of 50 percent, of the total aromatic amine sulfate present in the solutions and the formation of ammonium sulfate in the solution. The liquid liberated aromatic amine separates by gravity separation as an upper layer from the aqueous solution which is a lower layer in the separator zone, and the separated liquid aromatic amine is withdrawn from the first stage separating zone and returned ultimately to the sulfur dioxide absorbing step. Liquid aqueous solution containing the ammonium sulfate, aromatic aminesulfurous acid reaction product and residual aromatic aminesulfuric acid reaction product is withdrawn from the separated layer thereof in the first stage separating zone and passed into a second stage separating zone. Ammonia is added to the liquid aqueous solution in the second stage separating zone in an amount sufficient to result in the liberation of all or substantially all aromatic amine from the residual amount of total aromatic amine sulfate contained in the combined aqueous solutions or solution. The liberated liquid aromatic amine is separated by gravity separation as an upper layer in the second stage separator zone, and this separated liquid aromatic amine is withdrawn from the second stage separating zone and returned ultimately, usually after being combined with separated liquid aromatic amine which has been withdrawn from the first stage separating zone, to the sulfur dioxide absorbing step. The liquid aqueous solution containing the ammonium sulfate and aromatic aminesulfurous acid reaction product separates by gravity separation as a lower layer in the second stage separating zone, and the separated liquid aqueous solution is withdrawn from the second stage separating zone and passed to the regenerator zone.

The $SO_2$-containing gas which is supplied into the sulfurous acid scrubbing zone, and which is in addition to the $SO_2$ contained in $SO_2$-impoverished effluent gas passing into such scrubbing zone from the $SO_2$ absorbing zone, is preferably a pure or substantially pure $SO_2$ gas obtained elsewhere in the process.

The preferred organic base absorbent is the aromatic amines. Preferred among the aromatic amines are dimethyl aniline, i.e. N, N-dimethyl aniline, and a xylidine-water mixture containing the xylidine and water in a volume in the volume ratio range of 1:8 to 1:10 respectively. The dimethyl aniline is preferred for removal of $SO_2$ from a high strength $SO_2$-containing gas mixture containing in excess of 3 percent to up to about 10 percent $SO_2$ by volume. The xylidine-water mixture is preferred for removal of $SO_2$ from a lower or weaker strength $SO_2$-containing gas mixture containing about 1 percent to 3 percent $SO_2$ by volume.

Preferably the organic base absorbent liquid is withdrawn from each bubble tray in the upright or vertically elongated absorber zone or section of the tower or column, followed by cooling this withdrawn absorbent liquid. The cooled absorbent liquid is then returned to the same bubble tray in the absorber zone.

The sulfur dioxide-containing gas which is supplied into the sulfurous acid upright or vertically elongated scrubbing zone or section of the absorption tower, and which is in addition to the sulfur dioxide gas contained in sulfur dioxide-impoverished effluent gas passing into such scrubbing zone from the $SO_2$-absorbing zone, is preferably introduced into a lower portion of such scrubbing zone and most preferably beneath the lowermost tray or other gas-liquid contact means therein. Such sulfur dioxide-containing gas, which is preferably pure or substantially pure $SO_2$ gas obtained elsewhere in the process, is dissolved in water of the liquid aqueous ammonium sulfate-containing solution in this scrubbing zone to form dilute sulfurous acid aqueous solution. The liquid aqueous ammonium sulfate-containing solution, which is being passed from the regenerator zone, is preferably introduced into the upper portion of this sulfurous acid scrubbing zone above the uppermost tray or other gas-liquid contact means therein.

The process herein is preferably a continuous process.

The invention is further illustrated by the following example.

EXAMPLE

A cooled and clean gas mixture containing 6.0 percent by volume $SO_2$ (dry) and obtained from a copper smelter is introduced at a temperature of 100°F. and a volumetric feed rate of 32,500 SCFM (dry) through line 7 into absorber section 5 of absorption tower 6 below the lowermost tray therein by means of blower 8. Anhydrous liquid dimethyl aniline is pumped into the upper portion of absorber section 5 of tower 6 above the uppermost tray therein at a flow rate of 250 g.p.m. and a temperature of 80°F. from absorber surge supply tank 11 through line 12. The liquid dimethyl aniline absorbent passing downwardly in absorber section 5 is cooled indirectly by means of coolers 15 supplied with cooling water, and the dimethyl aniline absorbent is maintained at a temperature of about 75°F. at the top tray to about 100°F. at the bottom tray in absorber section 5. Sulfur dioxide-pregnant liquid dimethyl aniline absorbent is withdrawn at a temperature of about 100°F. from absorber section 5 through line 25 and pumped at a flow rate of 269 g.p.m. and at flow rates of $SO_2$, $SO_4$ and dimethyl aniline contained therein of 349.6 lbs/minute, 2.6 lbs/minute and 1963.4 lbs/minute respectively to surge tank 26. From surge tank 26 the pregnant liquid dimethyl aniline is pumped through line 27 to heat exchanger 28 wherein it is preheated by indirect heat exchange with a liquid water-dimethyl aniline mixture supplied at elevated temperature of typically 217°F. to heat exchanger 28 from stripping section 30 of tower 31 via line 29. The pregnant liquid dimethyl aniline is passed from heat exchanger 28 at a temperature of 176°F. through line 32 and introduced into stripping section 30 of tower 31. Sulfur dioxide is stripped from the pregnant liquid dimethyl aniline in stripping section 30 and the liberated sulfur dioxide gas passes upwardly into rectifying section 35. Stripped liquid dimethyl aniline and water (resulting from the cooling condensation of the steam in stripping the sulfur dioxide from the pregnant dimethyl aniline) are withdrawn from the lower portion of stripping section 30 below the lowermost tray therein through line 29 and passed at a temperature of 217°F. and a flow rate of 279 g.p.m. to heat exchanger 28. The hot liquid dimethyl aniline-water mixture preheats the pregnant dimethyl aniline feed to the stripping section 30 in heat exchanger 28 by indirect heat exchange as aforementioned, and is cooled in so doing. The liquid dimethyl aniline-water mixture is then passed at a temperature of 145°F. and a flow rate of 279 g.p.m. through line 37 to first stage separating tank 36 wherein this liquid mixture is introduced beneath the surface of a lower aqueous layer therein. The liquid mixture separates by gravity separation in separating tank 6 into an upper layer 36a of liquid dimethyl aniline and a lower water or aqueous layer 36b.

The $SO_2$-lean and dimethyl aniline-enriched effluent gas from absorber section 5 of tower 6 which contains about 0.15 percent by volume $SO_2$ and about 800–900 p.p.m. of gaseous dimethyl aniline, passes upwardly sequentially through sulfurous acid scrubbing section 9 and sulfuric acid scrubbing section 10. A tail gas containing 0.05 percent by volume $SO_2$ and virtually free of gaseous dimethyl aniline is withdrawn from sulfuric acid scrubbing section 10 through line 18. Substantially pure $SO_2$ gas bled off the upper $SO_2$ gas-containing space in liquefied $SO_2$ surge tank 59 and aqueous ammonium sulfate solution withdrawn from the lower portion of regenerator section 33 of tower 31 are separately supplied into scrubbing section 9 through lines 19 and 20 respectively. The $SO_2$ gas is supplied into the lower portion of scrubber section 9 below the lowermost tray therein through line 19 at a volumetric velocity or flow rate of 30 SCFM (dry) and at a temperature of 80°F. The liquid aqueous ammonium sulfate solution is pumped into the upper portion of scrubbing section 9 above the uppermost tray therein through line 20 at a temperature of 80 F. and a flow rate of 26 g.p.m. and at flow rates of ammonium sulfate and water contained therein of 13.0 lbs/minute and 208 lbs/minute respectively. The uprising $SO_2$ gas in scrubbing section 9 is dissolved in and reacts with the water of the downwardly flowing aqueous ammonium sulfate to form in scrubbing section 9 a dilute sulfurous acid-and ammonium sulfate-containing aqueous solution. A major portion, i.e. more than 50 percent, of the gaseous dimethyl aniline present in the gas is removed from the gas in scrubbing section 9 by reaction with the sulfurous acid in the presence of the ammonium sulfate to form dimethyl aniline sulfite. The aqueous sulfurous acid-and ammonium sulfate-containing scrubbing solution also containing the thus-formed dimethyl aniline sulfite is withdrawn from the lowermost tray in scrubber section 9 through line 62 at a temperature of 80°F. and passed at a flow rate of 34.8 g.p.m. and at flow rates of $SO_2$, $SO_4$ and dimethyl aniline contained therein of 5.0 lbs/minute, 0.6 lb/minute and 8.6 lbs/minute respectively to collection tank 63. The uprising effluent gas leaving scrubbing section 9 contains, by volume, about 60 to 80 p.p.m. of residual gaseous dimethyl aniline and about 0.07–0.10 percent $SO_2$, and the gas enters and passes upwardly within sulfuric acid scrubbing section 10. Dilute liquid aqueous sulfuric acid solution of 10 percent sulfuric acid concentration is supplied at a flow rate of 0.4 g.p.m. and at ambient temperature into the sulfuric acid scrubbing section 10 above the uppermost tray therein. Substantially all of the residual dimethyl aniline is removed from the gas in scrubbing section 10 by reaction with the sulfuric acid of the dilute sulfuric acid solution to form dimethyl aniline sulfate. Dilute liquid aqueous sulfuric acid solution containing the thus-formed dimethyl aniline sulfate is removed from the lowermost tray in scrubbing section 10 at a temperature of 80°F. and passed through line 64 at a flow rate of 16.4 g.p.m. and at flow rates of dimethyl aniline, $H_2SO_4$ and water contained therein of 41 lbs/minute, 15.6 lbs/minute and 141.2 lbs/minute respectively to recycle tank 65. A major portion of the dilute aqueous sulfuric acid solution containing the dimethyl aniline sulfate in tank 65 is withdrawn from a lower portion of tank 65 and pumped at a temperature of 80°F. and at a flow rate of 16 g.p.m. as recycle scrubbing solution through line 68 and introduced into scrubber section 10 above the uppermost tray therein. A minor or relatively small portion of the dilute sulfuric acid solution containing dimethyl aniline sulfate is withdrawn from an upper portion of recycle tank 65 through line 66 at a temperature of 80°F. and passed through line 66 at a flow rate of 0.4 g.p.m. to collection tank 63.

A gaseous mixture of gaseous dimethyl aniline, SO$_2$ gas and steam leaves stripping section 30 of tower 31 and enters and passes upwardly within rectifying section 35. Substantially all dimethyl aniline is removed from such gaseous mixture in rectifying section 35 by absorption in dilute aqueous sulfurous acid solution flowing downwardly in rectifying section 35. The sulfurous acid solution is formed in rectifying section 35 due to the dissolution of a minor portion of the SO$_2$ gas in liquid water resulting from condensation of all or virtually all of the steam. The gaseous dimethyl aniline reacts with the sulfurous acid in rectifying section 35 to form dimethyl aniline sulfite. Liquid aqueous solution containing sulfurous acid and dimethyl aniline sulfite is withdrawn from a lower portion of rectifying section 35 at an elevated temperature of 155°F. through line 40 and, after being indirectly cooled in cooler 93 with cooling water, is pumped at a temperature of 75°F. and a flow rate of 335 g.p.m. into the upper portion of rectifying section 35 above the uppermost tray therein through line 42.

SO$_2$ gas at a temperature of 80°F. and containing considerable water vapor is withdrawn from the top portion of tower 31 through line 43 at a flow rate of SO$_2$ and water of 347.7 lbs/minute and 3.5 lbs/minute respectively and passed into the lower portion of two stage drying tower 44. The water-containing gas passes serially upwardly in tower 44 in intimate countercurrent contact with moderate strength aqueous sulfuric acid solution in first packed drying stage 45, and then in intimate countercurrent contact with concentrated sulfuric acid in second drying stage 46 equipped with bubble cap trays. Moderate strength aqueous sulfuric acid solution of about 75 percent sulfuric acid concentration is supplied at an average temperature of 85°F. and a flow rate of 35 g.p.m. into the upper portion of first drying stage 45 through line 51, such sulfuric acid solution having been withdrawn from the bottom portion of tower 44 through line 48 at a temperature in the range of 85°F. to 100°F., pumped to cooler 49 and, after being indirectly cooled in cooler 49 with cooling water, returned to the upper portion of first drying stage 45 through lines 50 and 51 and introduced therein as is previously disclosed herein. Concentrated sulfuric acid of 98 percent concentration is pumped through line 55 into second drying stage 46 of tower 44 above the uppermost tray therein from acid feed tank 53. The concentrated acid is supplied to feed tank 53 through line 54 from an acid supply source. Substantially anhydrous SO$_2$ gas is withdrawn from the top portion of drying tower 44 through line 56 at a temperature of 85°F. and passed at a flow rate of 347.7 lbs/minute and under a pressure of 14.7 psia to compressor 57 wherein the SO$_2$ gas is compressed. The compressed SO$_2$ gases leaves the compressor 57 through line 61 at a temperature of 320°F. and under a pressure of 84.1 psia and is passed to condenser 58 wherein the SO$_2$ gas is cooled to a sufficiently low temperature to liquefy same. The liquefied SO$_2$ is passed from condenser 58 at a temperature of 100°F. and under a pressure of 84.1 psia through line 94 to liquefied SO$_2$ surge tank 59. From surge tank 59 the liquid SO$_2$ is pumped to liquid SO$_2$ storage.

The combined liquid aqueous scrubbing solutions containing dimethyl aniline sulfate, dimethyl aniline sulfite, sulfuric acid and sulfurous acid are withdrawn from collection tank 63 at a temperature of 80°F. and pumped through line 69 at a flow rate of 35.2 g.p.m and at flow rates of SO$_2$, SO$_4$ and dimethyl aniline contained therein of 5.0 lbs/minute, 0.6 lb/minute, and 9.6 lbs/minute respectively to first stage separating tank 36 and introduced beneath the surface of lower aqueous liquid layer 36b therein. NH$_3$ gas is supplied into separating tank 36 through line 71 at a volumetric flow rate of 23 SCFM (dry), and the NH$_3$ gas is introduced beneath the surface of the lower layer 36b of liquid aqueous solution in separating tank 36. The ammonia reacts with a major portion of the dimethyl aniline sulfate and water in separator 36 to liberate dimethyl aniline and to form ammonium sulfate. The liberated dimethyl aniline passes by gravity separation to the upper layer 36a of liquid dimethyl aniline in separating tank 36, from where anhydrous or substantially anhydrous dimethyl aniline is withdrawn through line 38 and passed at a temperature of 126°F. and a flow rate of 247 g.p.m. to tank 77. This anhydrous liquid dimethyl aniline is combined in tank 77 with anhydrous or substantially anhydrous liquid dimethyl aniline withdrawn from the upper layer 73a thereof in second stage separating tank 73 and the combined anhydrous liquid dimethyl aniline at a temperature of 126°F. is pumped from tank 78 to cooler 39 and, after being indirectly cooled in cooler 39 with cooling water, is introduced at a temperature of 80°F. into surge supply tank 11 through line 78. The anhydrous liquid dimethyl aniline is pumped from surge tank 11 through line 12 into the upper portion of absorber section 5 tower 6 as is hereinbefore disclosed. Aqueous liquid containing dimethyl aniline sulfite, ammonium sulfate and residual dimethyl aniline sulfate is withdrawn from the lower aqueous layer 36b in first stage separating tank 36 and passed at a temperature of 126°F. and a flow rate of 66 g.p.m. and flow rates of SO$_2$, SO$_4$ and dimethyl aniline of 5.5 lbs/minute, 0.5 lb/minute and 20 lbs/minute respectively through line 72 to second stage separating tank 73 wherein this aqueous liquid is introduced beneath the surface of the lower layer 73b of aqueous liquid therein. NH$_3$ gas is supplied into second stage separating tank 73 through line 75 at a volumetric flow rate of 4 SCFM (dry) and introduced beneath the surface of the lower layer 73b of aqueous liquid therein. Such amount of NH$_3$ gas supplied into separator 73 is sufficient to release the dimethyl aniline from all dimethyl aniline sulfate present in the aqueous liquid in separating tank 73. The ammonia reacts with the dimethyl aniline sulfate in separating tank 73 to release substantially all dimethyl aniline therefrom and to form ammonium sulfate. The liberated dimethyl aniline passes by gravity separation to the upper layer 73a in separator 73. Anhydrous or substantially anhydrous liquid dimethyl aniline is withdrawn from the upper layer thereof in separating tank 73 through line 76 at a temperature of 126°F. and passed at a flow rate of 3 g.p.m. to separated dimethyl aniline tank 77.

Liquid aqueous solution containing dimethyl aniline sulfite and ammonium sulfate is withdrawn from the lower aqueous solution layer 73b in separator 73 through line 79 at a temperature of 126°F. and passed at a flow rate of 63 g.p.m. and at flow rates of SO$_2$, ammonium sulfate, water, and dimethyl aniline contained therein of 5.5 lbs/minute, 18.0 lbs/minute, 503 lbs/minute and 18.2 lbs/minute respectively through line 79 to regenerator feed tank 80. This liquid aqueous solution is withdrawn from tank 80 and pumped at a temperature of 126°F. to heat exchanger 82 wherein it is preheated by indirect heat exchange with ammonium sulfate-containing aqueous solution at elevated temperature of 221°F. being passed to scrubbing section 9 of tower 6 through line 20. The preheated liquid aqueous solution is pumped from heat exchanger 82 through line 81 and at a temperature of 176°F. into the upper portion of regenerator section 33 of tower 31 above the uppermost tray in regenerator section 33. The liquid aqueous solution is withdrawn from the lower portion of regenerator section 33 through line 83, and heated in regenerator heaters 84 by indirect heat exchange with steam, after which the heated aqueous solution is re-introduced into regenerator section 33 below the lowermost tray therein. Due to the aqueous solution having been heated to its boiling point at the prevailing pressure, the dimethyl aniline sulfite is decomposed to liberate gaseous dimethyl aniline and $SO_2$ gas, and a considerable quantity of steam is generated. The thus-obtained gaseous dimethyl aniline, $SO_2$ gas and steam pass upwardly in regenerator section 33 and into stripping section 30, wherein at least the steam is utilized as a stripping medium to strip sulfur dioxide from $SO_2$-pregnant dimethyl aniline absorbent as is previously disclosed herein.

Liquid aqueous solution containing ammonium sulfate is withdrawn from regenerator section 33 through line 20 at a temperature of 221°F. and a rate of 36 g.p.m. and, after being used to preheat liquid aqueous solution containing dimethyl aniline sulfate and ammonium sulfate flowing in line 81 by indirect heat exchanger in exchanger 82 and then cooled by indirect cooling with cooling water in cooler 93, is passed into sulfurous acid scrubbing section 9 above the uppermost tray therein as is previously disclosed herein. Prior to being cooled and introduced into scrubbing section 9, a small amount of the liquid aqueous ammonium sulfate-containing solution containing 60 g/l ammonium sulfate is bled off through line 92 at a bleed flow rate of 10 g.p.m. The remaining major or predominant portion of liquid aqueous ammonium sulfate-containing solution is pumped, after leaving cooler 93, through line 20, at a temperature of 80°F. and a flow rate of 26 g.p.m. and at flow rates of ammonium sulfate and water contained therein of 13.0 lbs/minute and 208 lbs/minute respectively and introduced into scrubbing section 9 of tower 6 as hereinbefore disclosed.

In the foregoing example the symbols "g.p.m." means gallons or gallon per minute, "psia" means pounds per square inch absolute, "p.p.m." means parts per million, "g/l" means grams per liter, and "SCFM" means standard cubic feet of gas per minute, which is the cubic feet of gas per minute at standard conditions of 0°C. and 760 mm. of Hg pressure. The temperatures and flow rates set forth in the foregoing example are average temperatures and average flow rates.

What is claimed is:

1. In a process for recovering sulfur dioxide from a gas mixture containing the same which comprises absorbing sulfur dioxide from the gas mixture by contacting the gas mixture in an absorption zone with a liquid, water-insoluble aromatic amine absorbent capable of releasing the sulfur dioxide upon subsequent treatment, scrubbing sulfur dioxide-impoverished effluent gas containing gaseous aromatic amine absorbent from said absorption zone with dilute sulfuric acid solution in a sulfuric acid scrubbing zone to remove substantially all residual aromatic amine absorbent from the gas, stripping sulfur dioxide from sulfur dioxide-pregnant absorbent from the absorption zone in a stripping zone, and recovering the liberated sulfur dioxide from the stripping zone, the improvement which comprises subsequent to the sulfur dioxide absorbing step and prior to the sulfuric acid solution scrubbing, scrubbing the sulfur dioxide-impoverished effluent gas containing gaseous aromatic amine absorbent from the absorption zone in a sulfurous acid scrubbing zone with a sulfurous acid- and ammonium sulfate-containing aqueous solution, the presence of the ammonium sulfate in the aqueous solution in the sulfurous acid scrubbing zone resulting in an appreciable greater recovery of the aromatic amine in said sulfurous acid scrubbing zone than in the absence of the ammonium sulfate, the sulfurous acid-and ammonium sulfate-containing aqueous solution being formed in the sulfurous acid scrubbing zone by supplying sulfur dioxide-containing gas into said sulfurous acid scrubbing zone, the sulfur dioxide-containing gas supplied into the sulfurous acid scrubbing zone being in addition to sulfur dioxide contained in sulfur dioxide-impoverished effluent gas passing into said sulfurous acid scrubbing zone from said absorption zone, supplying a liquid aqueous solution consisting essentially of dissolved ammonium sulfate from a regenerating zone into said sulfurous acid scrubbing zone, the sulfur dioxide being dissolved in the water of the liquid aqueous solution consisting essentially of ammonium sulfate to form the 4 sulfurous acid-and ammonium sulfate-containing aqueous solution; combining the scrubbing aqueous solution containing aromatic amine sulfite and scrubbing aqueous solution containing aromatic amine sulfate from the sulfurous acid and sulfuric acid scrubbing zones respectively, adding ammonia to the combined scrubbing aqueous solutions in a separating zone, the ammonia being added to the combined solutions in amount sufficient to result in the release of the aromatic amine from the aromatic amine sulfate therein and formation of ammonium sulfate in said separating zone, separating the liquid aromatic amine from an aqueous liquid phase containing the ammonium sulfate and aromatic amine sulfite in said separating zone, withdrawing separated liquid aromatic amine from the separating zone and returning the withdrawn liquid aromatic amine ultimately to the sulfur dioxide absorbing step in the absorption zone, withdrawing aqueous liquid phase containing the aromatic amine sulfite from said separating zone and passing the aqueous liquid phase to the regenerating zone, heating said aqueous liquid phase in the regenerating zone to decompose the aromatic amine sulfite and liberate gaseous aromatic amine and sulfur dioxide gas and generate steam, passing the gaseous aromatic amine, sulfur dioxide gas and steam into the stripping zone, and withdrawing a liquid aqueous solution consisting essentially of dissolved ammonium sulfate from the regenerating zone and passing at least 50 percent by volume of the withdrawn liquid aqueous solution consisting essentially of dissolved ammonium sulfate for supply into the sulfurous acid scrubbing zone as aforesaid, a reduced amount of sulfuric acid solution being required for removal of the residual aromatic amine absorbent from the gas in the sulfuric acid scrubbing zone due to the scrubbing removal of the aromatic amine from the gas with the sulfurous acid-and ammounium sulfate-containing aqueous solution in the sulfurous acid scrubbing zone than in the absence of the ammonium sulfate.

2. The process of claim 1 wherein the sulfur dioxide other than the sulfur dioxide contained in the $SO_2$- impoverished effluent gas from the absorbing step is supplied into the sulfurous acid scrubber zone in amount sufficient to form an amount of sulfurous acid therein by dissolution in water which is at least equivalent to the content of aromatic amine to effluent gas passing into said scrubber zone from the sulfur dioxide absorbing step but which is insufficient to result in an amount of sulfur dioxide in excess of 0.10 percent by volume $SO_2$ in the tail gas from the sulfuric acid scrubbing zone.

3. The process of claim 2 wherein the sulfur dioxide-containing gas supplied into the sulfurous acid-scrubbing zone is substantially pure $SO_2$ gas obtained from elsewhere in the process.

4. The process of claim 3 wherein the substantially pure sulfur dioxide gas is obtained from product $SO_2$ storage.

5. The process of claim 3 wherein the substatially pure sulfur dioxide gas is obtained from a top $SO_2$ gas-containing portion of a liquefied $SO_2$ surge tank.

6. The process of claim 1 wherein the ammonia is added to the combined liquid aqueous solutions in at least two separating zones, the ammonia being added to the combined liquid aqueous solutions in a first stage separating zone in an amount sufficient to result in the release of the aromatic amine from a portion of aromatic amine sulfate present therein and the formation of ammonium sulfate, withdrawing separated liquid aromatic amine from the first stage separating zone returning the withdrawn liquid aromatic amine and ultimately to the sulfur dioxide-absorbing step, liquid aqueous solution containing ammonium sulfate, the aromatic amine sulfite, and residual aromatic amine sulfate being withdrawn from a separated layer thereof in the first stage separating zone and passed into a second stage separating zone, the ammonia being added to the liquid aqueous solution in the second stage separating zone in an amount sufficient to result in the release of substantially all aromatic amine from the residual aromatic amine sulfate in the aqueous solution, liberated liquid aromatic amine being separated from aqueous liquid solution in the second stage separator zone, the separated liquid aromatic amone being withdrawn from the second stage separating zone and returned ultimately to the sulfur dioxide-absorbing step, and separated aqueous liquid solution containing ammonium sulfate and aromatic amine sulfite being withdrawn from the second stage separating zone and passed to the regenerator zone.

7. The process of claim 6 wherein the ammonia is added to the combined liquid aqueous solutions in two separating zones.

8. The process of claim 6 wherein the ammonia is added as ammonia gas.

9. The process of claim 6 wherein the aromatic amine is dimethyl aniline.

10. The process of claim 1 wherein the amount of ammonia added to the combined aqueous solutions in the separating zone is at least equivalent to the total content of sulfate radical present in aromatic amine sulfate contained in the combined aqueous solutions.

11. The process of claim 10 wherein the amount of ammonia added to the combined aqueous solutions in the separating zone is equivalent to the total content of sulfate radical present in aromatic amine sulfate contained in the combined aqueous solutions.

12. The process of claim 10 wherein the ammonia is added as ammonia gas.

13. The process of claim 1 wherein a stripped liquid aromatic amine absorbentwater mixture is passed from the stripping zone to a separating zone for separation of the aromatic amine absorbent from the water.

14. The process of claim 13 wherein the stripped liquid aromatic amine absorbent-water mixture is withdrawn at elevated temperature from the striping zone and, prior to being introduced into the separating zone, is passed in indirect heat exchange relationship with sulfur dioxide-pregnant organic base absorbent being passed to the stripping zone thereby preheating the pregnant aromatic amine absorbent prior to its introduction into the stripping zone and cooling the stripped aromatic amine absorbent-water mixture prior to its introduction into the separating zone.

15. The process of claim 1 wherein the ammonia is added as ammonia gas.

16. The process of claim 15 wherein the aromatic amine is demethyl aniline.

17. The process of claim 1 wherein the liquid aqueous ammonium sulfate solution consisting essentially of dissolved ammonium sulfate is withdrawn at elevated temperature from the regenerating zone and, prior to being passed to the sulfurous acid scrubbing zone, is passed in indirect heat exchange relationship with an aromatic amine sulfite-containing aqueous solution being passed to the regenerating zone to thereby preheat the last-mentioned aqueous solution prior to its introduction into the regenerating zone and to thereby cool the ammonium sulfate-containing solution prior to its introduction into the sulfurous acid scrubbing zone.

18. The process of claim 1 wherein liquid aromatic amine absorbent is withdrawn from each tray of an upright absorber zone provided with spaced-apart bubble cap trays, followed by cooling the withdrawn absorbent liquid and returning the cooled absorbent liquid to the same tray in said absorber zone.

19. The process of claim 1 wherein the amount of ammonia added to the combined aqueous solutions in the separating zone is sufficient to result in the liquid aqueous solution at a lower portion of the regenerating zone to have a pH in the range of 5 to 6.

20. The process of claim 1 wherein about 60 percent to about 90 percent by volume of the withdrawn liquid aqueous solution consisting essentially of dissolved ammonium sulfate from the regenerating zone is passed to the sulfurous acid scrubbing zone.

21. The process of claim 1 wherein about 65 percent to about 80 percent by volume of the withdrawn liquid aqueous solution consisting essentially of dissolveed ammonium sulfate from the regenerating zone is passed to the sulfurous acid scrubbing zone.

22. The process of claim 1 wherein the amount of ammonia added to the combined aqueous solutions in the separating zone is sufficient to result in the liquid aqueous solution at a lower portion of the regenerating zone to have a pH in the range of 5.5 to 6.

23. The process of claim 1 wherein the aromatic amine is dimethyl aniline.

24. The process of claim 1 wherein the aromatic amine is xylidine present in a xylidine-water mixture.

25. In a process for recovering sulfur dioxide from a gas mixture containing the same comprising absorbing sulfur dioxide from the gas mixture by contacting the gas mixture in an absorption zone with a liquid water-insoluble aromatic amine absorbent capable of releasing the sulfur dioxide upon subsequent treatment, treating sulfur dioxide-pregnant aromatic amine absorbent withdrawn from the absorption zone to cause the sulfur dioxide to be released from the liquid absorbent, recovering the thus-released sulfur dioxide, and scrubbing sulfur dioxide-impoverished effluent gas containing gaseous aromatic amine absorbent from the absorbing zone in a sulfuric acid scrubbing zone with dilute sulfuric acid solution to remove the aromatic amine absorbent from the gas, the improvement which comprises subsequent to the sulfur dioxide-absorbing and prior to the sulfuric acid solution scrubbing, scrubbing the sulfur dioxide-impoverished effluent gas containing gaseous aromatic amine absorbent from the absorption zone in a sulfurous acid scrubbing zone with sulfurous acid solution also containing ammonium sulfate to remove a major portion of the organic base absorbent from the gas, the presence of the ammonium sulfate in the aqueous solution in the sulfurous acid scrubbing zone resulting in an appreciably greater recovery of the aromatic amine in said sulfurous acid scrubbing zone than in the absence of ammonium sulfate, the sulfurous acid-and ammonium sulfate-containing aqueous solution being formed in the sulfurous acid scrubbing zone by supplying sulfur dioxide-containing gas into the scrubbing zone which is in addition to sulfur dioxide contained in the sulfur dioxide-impoverished effluent gas passing into the sulfurous acid scrubbing zone from the absorption zone, and supplying at least 50 percent by volume of a liquid aqueous solution consisting essentially of dissolved ammonium sulfate withdrawn from an absorbent regenerating zone into said sulfurous acid scrubbing zone than in the absence of ammonium sulfate, the sulfur dioxide being dissolved in the water of the liquid aqueous solution consisting essentially of dissolved ammonium sulfate in the last-mentioned scrubbing zone to form the sulfurous acid-and ammonium sulfate-containing aqueous solution, a reduced amount of sulfuric acid solution being required for removal of the residual aromatic amine absorbent from the gas in the sulfuric acid scrubbing zone due to the scrubbing removal of the aromatic amine from the gas with the sulfurous acid-and ammonium sulfate-containing aqueous solution in the sulfurous acid scrubbing zone.

26. The process of claim 25 wherein the sulfur dioxide-containing gas is substantially pure $SO_2$ gas obtained elsewhere in the process and is supplied into a lower portion of an upright sulfurous acid scrubbing zone, and the liquid aqueous solution consisting essentially of dissolved ammonium sulfate is supplied into an upper portion of the last-mentioned scrubbing zone.

* * * * *